Dec. 20, 1955   D. L. McDONALD ET AL   2,727,884
PROCESS OF MASS POLYMERIZATION IN VERTICAL UNMIXED STRATA
Filed April 13, 1953   2 Sheets-Sheet 1
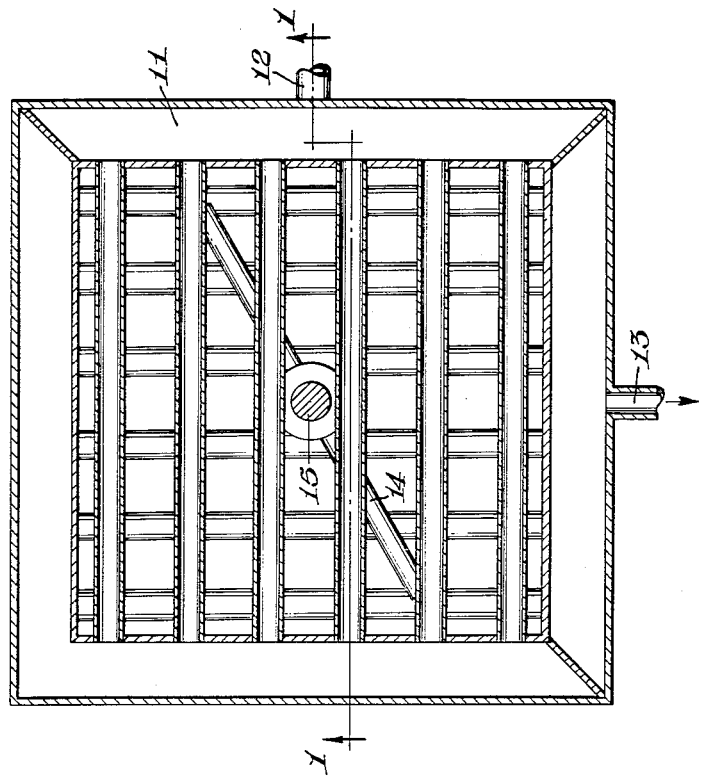
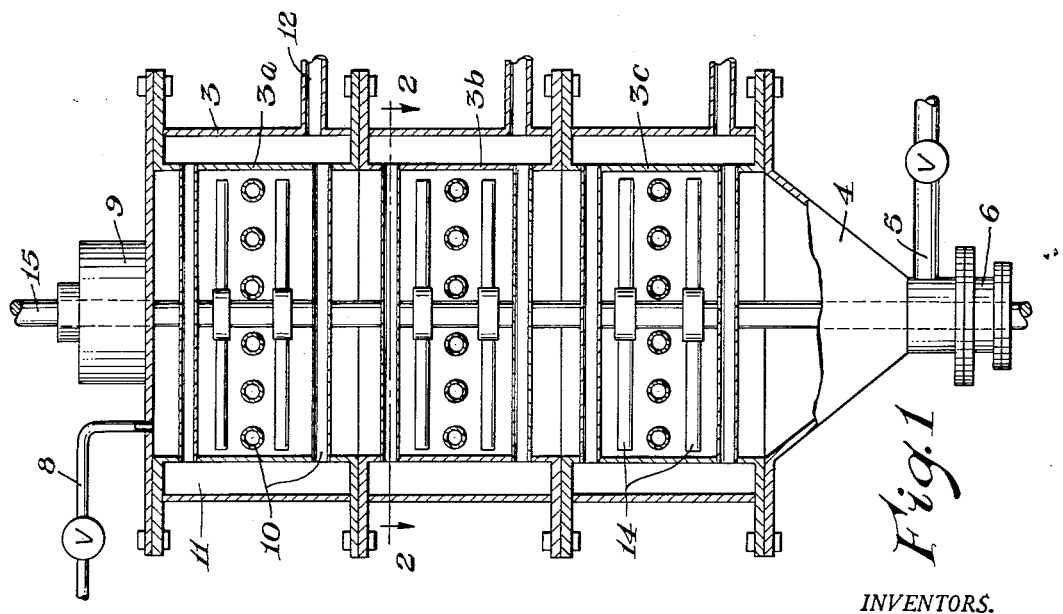
INVENTORS.
Donald L. McDonald
Kenneth C. Coulter
John Lloyd McCurdy
BY Griswold & Burdick
ATTORNEYS

United States Patent Office 2,727,884
Patented Dec. 20, 1955

2,727,884

PROCESS OF MASS POLYMERIZATION IN VERTICAL UNMIXED STRATA

Donald L. McDonald, Coleman, and Kenneth E. Coulter, Midland, Mich., and John Lloyd McCurdy, Torrance, Calif., assignors to The Dow Chemical Company, Midland, Mich., a corporation of Delaware Application April 13, 1953, Serial No. 348,182

7 Claims. (Cl. 260—93.5)

This invention concerns an improved method for polymerizing vinyl and vinylidene compounds continuously to form a uniform product of high quality. It relates more particularly to a method for polymerizing styrene continuously during flow through one or more polymerization zones and pertains especially to a method for controlling flow of a reacting mass through one or more polymerization zones in a tower or column which mass becomes more viscous as the polymerization proceeds.

In prior attempts at continuous mass polymerization of styrene several defects have become apparent. The most common proposal is to feed monomeric styrene slowly and continuously into a tower of large diameter and to withdraw polymer from the bottom of the tower at a corresponding and extremely slow rate, while attempting to adjust and control the temperatures at various levels in the tower to effect polymerization and control the viscosity of the product at a value to permit flow. Cooling has been required in the upper levels of the tower because of the exothermic polymerization and heating has been required at the bottom to decrease the polymer viscosity. In addition to presenting a difficult problem of maintaining the desired temperature conditions, such process has always resulted in a non-uniform product because of the tendency for the liquid monomer to channel into, or through, and become admixed with, the polymer mass. Such channeling, or mixing of monomer and polymer, apparently results both from a tendency of the polymer to cling to inner surfaces of the polymerization vessel with resultant flow of monomer, or a relatively dilute solution of polymer in monomer, over the adhering viscous polymer and a tendency of the liquid monomer to flow more rapidly than the polymer over externally-heated surfaces of the vessel. Such vertical mixing of monomer and polymer is highly undesirable and results in a non-uniform product of unpredictable quality. The products heretofore obtained from continuous polymerization of styrene in a tower have had a high content of residual volatile matter and while they are capable of being molded to give sound moldings, the molded articles exhibit extreme dimensional distortion due to heat, or contain a high content of methanol soluble substances, which render such products unattractive to the trade.

Methods heretofore proposed for maintaining the desired conditions in prior attempts at continuous mass polymerization of styrene in a tower include the provision of internal coils, external jackets, or both, in, or along, the tower for passage of a heating or cooling medium therethrough to transfer heat to, or from, the mass, and with vigorous and turbulent agitation of the mass during the exothermic polymerization prior to feeding the partially polymerized material to a column as described in U. S. Patent No. 2,496,653; or without agitation in a tower as described by Dunlop et al., Ind. Eng. Chem., vol. 40, pages 654–656 (1948); or with the passage of a heating or cooling medium through a non-agitating hollow vertical sweep rotating in a reacting mass of material in a prepolymerizer as described in U. S. Patent No. 2,530,409.

In all such prior methods certain defects have become apparent. The most troublesome are the tendency for the liquid monomer to flow more rapidly, from inlet to exit, along or near heated surfaces where the mass is most fluid, and the tendency for the polymer to cling to inner surfaces of the polymerization vessel, both of which defects result in channeling in the mass being treated and the production of a non-uniform product of unpredictable quality.

The above-mentioned and other disadvantages of the processes heretofore proposed for the continuous mass polymerization of styrene make desirable the provision of a method whereby such disadvantages may be avoided or overcome. It is a principal object of this invention to provide a method for the continuous polymerization of a vinyl or vinylidene compound to produce a uniform polymer with a low content of residual volatile matter. Another object is to provide such method for the continuous polymerization of vinyl and vinylidene compounds in one or more elongated polymerization zones, which method avoids, or substantially overcomes, the tendency of liquid monomers toward channeling in said polymerization zones. A further object is the provision of a method for preventing or curtailing vertical mixing of a solution comprising a vinyl or vinylidene compound while progressively polymerizing the solution by causing it to flow through one or more elongated polymerization zones, which method permits formation of a useful polymer with little residual volatile matter. A specific object is the provision of a method comprising controlled and continuous polymerization of styrene in one or more elongated polymerization zones without vertical mixing, to form a polymer of high molecular weight, with little residual volatile material, and a low content of methanol soluble substances. Other and related objects may appear as the description of the invention proceeds.

The invention comprises a process which involves feeding a monomeric polymerizable vinyl or vinylidene compound, or a solution or inert medium, containing one or more of such polymerizable compounds, into an elongated polymerization zone substantially filled with a reacting mass comprising the monomer(s) and the (co)polymer being formed, where the fluid mass is continuously moved forward through said elongated zone and is subjected to polymerization temperatures to progressively polymerize the monomer while at the same time subjecting successive portions of the mass to gentle non-turbulent stirring transversely to the axis of said elongated polymerization zone sufficient to prevent or substantially reduce the tendency for the monomer to channel through the mass, and continuously withdrawing a portion of the mass containing polymer in amount corresponding to at least 25 per cent by weight of that which is theoretically possible and replenishing the elongated polymerization zone with monomer, or a solution or suspension of monomer and polymer, of lower polymer content than the material being withdrawn.

Surprisingly, it has been found that gentle non-turbulent stirring of successive portions of the mass in an elongated polymerization zone, e. g. a tower or column, to a degree far less than is required to produce turbulence, by action of blades or cross-arms slowly rotating in the mass transversely to the axis of the elongated zone and at successive distances from one another along the axis, is sufficient to prevent, or substantially overcome, the tendency for the monomer to channel in the mass. Such gentle transverse stirring causes the material to flow through said zone as successive strata, or layers, and results in a substantial decrease in the temperature irregularities in the reacting mass. More specifically, non-turbulent stirring of successive portions of the reacting mass by action of relatively narrow blades, e. g. blades having a width of from 0.5 to 3 inches, slowly rotating in the mass transversely to the overall direction of flow through an elongated polymerization zone at successive distances from one another along the axis of flow, causes the mass to stratify into layers, which layers contain a progressively increasing amount of polymer, from inlet to exit, in the elongated polymerization zone.

The degree of stratifying which occurs in the polymerizing mass will vary, depending in part upon the distance between the stirrer blades along the axis of rotation, or overall axis of flow of the mass, and also upon the rate of flow of the mass through the elongated polymerization zone. In general, spacing of the blades at distances of from 2 to 24 inches from one another along a shaft having substantially the same longitudinal axis as the elongated polymerization zone and rotation of said blades at a rate of from 1 to 60 revolutions per minute, is satisfactory. The blades may be of any desired shape or design such as simple cross-arms, or bars, with little, if any, pitch and of straight or curved shape, e. g. S-shaped.

The method of the invention will be more particularly described with reference to the accompanying drawings wherein:

Fig. 1 is a schematic drawing, partly in section, of a vertical jacketed polymerization vessel of square cross section, having internal tubes for passage of a heating or cooling medium therethrough, and showing an agitator or stirrer with simple cross-arm blades. The tower comprises an elongated polymerization zone suitable for use in practice of the invention.

Fig. 2 is an enlarged cross-sectional view of the vessel taken along the line 2—2 of Fig. 1, showing an arrangement of the internal tubes and the stirrer.

Figure 3:
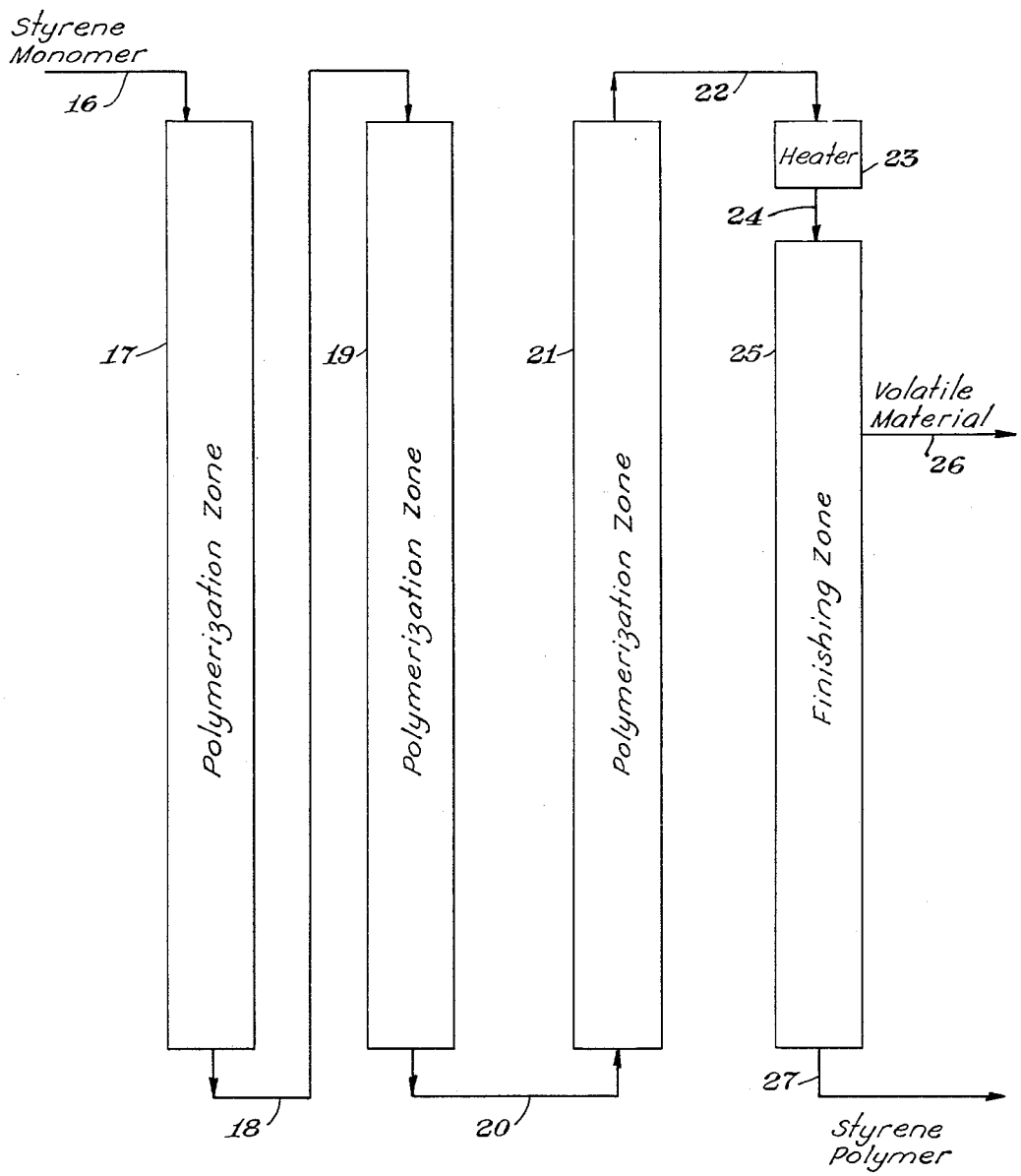
Fig. 3 is a diagrammatic flow sheet illustrating the process as carried out using a plurality of elongated polymerization vessels and a finishing vessel with continuous flow of material through the series of vessels.

In the drawings, the numeral 3 indicates a square polymerization vessel or tower. The vessel may be of any desired cross-sectional shape, e. g. square or circular. The vessel 3 is constructed of a number of similar jacketed and flanged sections 3a, 3b and 3c, a lower cone-shaped section 4 having valved outlet 5 and stuffing box 6, and a cover 7 having valved inlet 8 and stuffing box 9, for ease of assembly, which component parts are connected together in any usual way, e. g. by bolts. Each of the flanged sections 3a, 3b and 3c is provided with internal tubes 10 connected to a surrounding chamber 11 between the shell and the jacket having an inlet 12 and an outlet 13 to said chamber for passage of heating or cooling fluid therethrough, as required. The tubes are of any desired size, suitably of from 0.5 to 2 inches in diameter, although larger tubes may be used. The tubes 10 are suitably disposed as a number of banks of parallel tubes, in horizontal planes, at successive intervals within each of the sections 3a, 3b and 3c and with the longitudinal axes of alternate banks of the tubes at right angles to the axes of the adjacent banks of tubes. Any suitable number of such tubes, or banks of tubes, may be used. The lower section 4 may be jacketed and provided with a suitable inlet and outlet for passage of heating or cooling fluid through the chamber between the shell and the jacket, or the section may be heated electrically, e. g. by means of surrounding electrical resistance units connected to a source of power. An agitator comprising a number of blades 14 and a shaft 15 journaled in the stuffing boxes 6 and 9, and extending beyond the latter, is positioned centrally within the vessel 3. The blades 14 are positioned along the shaft 15 so that the blades rotate between the banks of tubes 10. The blades are suitably of from 0.5 inch to 3 inches in width and may be of any suitable design or pitch, e. g. round or square bars with little, if any, pitch and of straight or S-shaped design. The agitator is rotated by means of a motor-driven gear (not shown) connected to the shaft 15 in the conventional manner.

Fig. 2 is an enlarged cross-sectional view taken along the line 2—2 of Fig. 1 and illustrates a way in which the tubes 10 may be disposed within the vessel 3. Alternate banks of the tubes are usually disposed at right angles to each other. The blades 14 of the agitator rotate between the banks of tubes. Heating or cooling fluid is passed through the tubes via an inlet 12 and an outlet 13, to the chamber 11 surrounding each of the sections 3a, 3b and 3c, as required.

Fig. 3 is a diagrammatic flow sheet illustrating a continuous process for employing three interconnected polymerization towers similar to that shown in Figs. 1 and 2, and a finishing vessel which process has satisfactorily been employed for the continuous polymerization of styrene.

The method of the present invention, as illustrated with respect to the polymerization of styrene, comprises the continuous introduction of clean dry styrene monomer through line 8 from a storage vessel (not shown) to the top of a body of liquid monomer and partial polymer in a vertical elongated polymerization vessel 3, similar to that shown in Figs. 1 and 2 of the drawing, at a rate to keep the vessel full of liquid, or to maintain a constant level therein. Successive portions of the mass are gently stirred with non-turbulent agitation by slowly rotating the agitator blades 14, e. g. at from 1 to 60 revolutions per minute. The mass is maintained at a desired polymerization temperature, preferably at a polymerization temperature between 85° and 130° C. by withdrawing heat from, or supplying heat to, the liquid body through the walls of the vessel and within the body of the liquid by means of the tubes 10. A portion of the mass is continuously withdrawn from a lower outlet 5 in the vessel and the rate of feed to the vessel adjusted to correspond in amount to the mass being withdrawn. The rate of passage of styrene through the polymerization vessel is preferably adjusted to effect an amount of polymerization between 25 and 75 per cent of that which is theoretically possible, when employing a single elongated polymerization vessel in the process.

In a preferred practice, two or more of the vertical elongated polymerization vessels are connected in series and employed in the process in an arrangement as illustrated in Fig. 3 of the drawings. Styrene monomer, or preferably a mixture of styrene monomer and an inert solvent having a boiling point between 130° and 200° C. such as ethylbenzene, ethyltoluene, ethylxylene, diethylbenzene, or isopropylbenzene, in amount corresponding to from 5 to 20 per cent by weight of the mixture, is continuously fed through line 16 to the top of a body of the reacting liquid and the polymer being formed in a first vertical elongated polymerization vessel 17, similar to that described in Figs. 1 and 2 of the drawings. It is slowly forwarded through said vessel and is subjected to polymerization temperatures between 85° and 130° C., and to gentle non-turbulent stirring of successive portions of the reacting mass transversely to the longitudinal axis of said vessel, whereby channeling of liquid monomer in the mass is overcome and said mass stratifies into adjacent layers each containing a progressively increasing amount of polymer as portions of the layers of the mass move forward through the vessel and the monomer is further polymerized, until a solution containing at least 25, suitably from 25 to 50, per cent by weight of polymer is obtained. A portion of the solution of hot partial polymer is continuously withdrawn from an outlet to the first polymerization vessel 17, via line 18 and is fed to the top of a second elongated polymerization vessel 19, substantially filled with a reacting mass of the monomer and the polymer being formed. The mass is continuously moved forward through the second elongated polymerization vessel 19, and is subjected to polymerization temperatures of up to about 150° C. and is progressively further polymerized, suitably up to 70 per cent of that which is theoretically possible, while subjecting successive portions of the reacting mass to gentle non-turbulent stirring transversely to the axis of flow in said vessel to prevent channeling or vertical mixing of the reacting mass in the second polymerization vessel. A portion of the hot fluid mass is continuously withdrawn from the second reaction vessel 19, via line 20 and is fed into the bottom of a third elongated polymerization vessel 21, substantially filled with a reacting mass containing upwards of 70 per cent by weight or more, of polymer. The mass is continuously moved forward (upward) through the polymerization vessel 21, suitably under an applied pressure by means of a plastics pump (not shown) interposed in line 20 for withdrawing material from vessel 19 and feeding the same into vessel 21, and is subjected to higher polymerization temperatures of from 165° C. up to 240° C., preferably between 165° and 185° C., to substantially polymerize the remaining monomer, while gently stirring the mass transversely to the axis of flow to prevent channeling. A portion of the hot substantially polymerized mass is continuously withdrawn from the top of vessel 21, via line 22, and is passed through a heater 23, where it is heated to temperatures within the range of from 220° to 240° C. and is fed via line 24, into the top of a finishing kettle 25. Finishing vessel 25 is a vertically mounted cylindrical vessel having in its top an inlet and polymer receiving cup in direct communication with line 24, the bottom of which cup is a multiple orifice plate through which molten polymer may fall in fine streams to the bottom of kettle 25. In the upper third of cylindrical kettle 25 is an outlet 26 which is connected to a vacuum pump (not shown) for withdrawing volatile material. The molten polymer is withdrawn from vessel 25 via line 27. The main body of finishing kettle 25 is surrounded by a heating jacket to keep molten the polymer devolatilized in said kettle. Volatile ingredients such as unreacted monomer, or ethylbenzene employed as a solvent in the process, may be separated from the polymer in other usual ways, e. g. by heating the hot substantially polymerized mass withdrawn from vessel 21, to temperatures of from 225° to 240° C. on heated rolls in a vacuum or partial vacuum and separately withdrawing vapors of the volatile ingredients and the polymer from the zone of reduced pressure, and cooling the polymer.

The method may be employed for the continuous polymerization of any organic vinyl or vinylidene compound in solution, or a medium, which mass becomes more viscous as the monomers are progressively polymerized. For instance, the method may be employed for the continuous polymerization of acrylonitrile by feeding an aqueous solution of an inorganic salt, e. g. an aqueous 60 per cent by weight solution of zinc chloride, containing monomeric acrylonitrile, into an elongated polymerization vessel similar to that described in Figs. 1 and 2 of the drawings, substantially filled with a fluid mass comprising the salt solution, monomeric acrylonitrile and the polymer being formed, where the mass is continuously moved forward through said elongated vessel and is subjected to polymerization temperatures, usually a selected temperature between 40° and 60° C., and to gentle non-turbulent stirring of successive portions of the mass to prevent channeling as the monomer is progressively polymerized, and continuously withdrawing a portion of the mass containing polymer in amount of 50 per cent by weight or more of that which is theoretically possible while continuing feed of the monomer and the salt solution to the polymerization vessel.

The method may also be applied to the polymerization of vinyl chloride, vinyl acetate, or ethyl acrylate, in an organic solvent by feeding a solution of a suitable organic solvent and the monomer, or a partially polymerized solution of solvent and monomer, to an elongated polymerization zone substantially filled with a body comprising the solvent, the monomer and the polymer being formed, which fluid mass is subjected to usual polymerization temperatures and to gentle non-turbulent stirring of successive portions of the same to prevent channeling as the monomer is progressively polymerized. The method may be applied to the continuous polymerization of vinylidene chloride, or vinyl chloride, or mixtures of the same, by feeding the monomer and water to an elongated polymerization zone substantially filled with a fluid body comprising a flowable slurry of water, monomer and the polymer being formed, which fluid body is subjected to usual polymerization temperatures, suitably of from 40° to 70° C., and to gentle non-turbulent stirring of successive portions of the mass to prevent channeling as the monomer is progressively polymerized and continuously withdrawing a portion of the fluid mass or slurry containing polymer in amount of approximately 80 per cent by weight of that which is theoretically possible.

The method is preferably employed for the continuous polymerization of monovinyl aromatic compounds to form normally solid polymers of high quality, i. e. having good mechanical properties and a low content of methanol soluble substances. Examples of suitable monovinyl aromatic compounds that may be polymerized continuously by the method herein described are styrene, ortho-vinyltoluene, meta-vinyltoluene, para-vinyltoluene, meta-ethylstyrene, para-isopropylstyrene, ortho-chlorostyrene, para-chlorostyrene, para-ethylstyrene, vinylxylene, or mixtures of any two or more of such monovinyl aromatic compounds. Mixtures of such monovinyl aromatic compounds with other copolymerizable vinyl or vinylidene compounds such as vinyl chloride, vinyl acetate, ethyl acrylate, alpha-methylstyrene, methyl methacrylate, or acrylonitrile, which mixture of polymerizable olefinic compounds contains at least 75 per cent by weight or more of a monovinyl aromatic compound such as styrene or vinyltoluene may also be used.

Polystyrene prepared by the process of the invention is particularly distinguished from the usual commercial grade polystyrene by forming molded articles having high dimensional stability to heat and also by improvement in one or more of the properties tensile strength, flow-time, or molecular weight, and by having a low percentage of methanol soluble substances.

In the continuous polymerization of styrene to form a normally solid polymer of high molecular weight the method is most advantageously employed during the intermediate stages of the polymerization, e. g. during flow of the reacting mass through one or more of the elongated polymerization vessels when the mass has a viscosity corresponding to that caused by a polymer content of about 25 per cent, or greater, and is usually most beneficial when the reacting mass has a polymer content between 25 and 80 per cent of that which is theoretically possible. The method may be carried out by feeding a prepolymerized solution of styrene monomer and polymer, e. g. a solution of monomeric styrene containing about 25 per cent by weight of polymer into an elongated polymerization vessel substantially filled with a reacting mass of the monomer and the polymer being formed, or into the first of a plurality of such elongated polymerization vessels connected in series. It is slowly forwarded through said vessel, or series of vessels, and is subjected to polymerization temperatures of from 85° up to 240° C., usually temperatures of from 130° C. up to 185° C. and to gentle non-turbulent stirring of successive portions of the mass to prevent or curtail channeling as the monomer is progressively polymerized as hereinbefore described.

Flow of the reacting mass through one or more elongated polymerization vessels such as vertical towers or columns may be either upward or downward, i. e. two or more elongated polymerization vessels may be connected together in any desired manner. Flow of the material is preferably downward in a first or single polymerization vessel until the reacting mass has a viscosity corresponding to that produced by polymerization of about 25 per cent by weight of the monomers, i. e. has a viscosity of 70 centipoises, or more, at 25 C. Thereafter, the mass may be passed either upward or downward through one or more vertical elongated polymerization vessels substantially filled with a body of the material to complete or substantially complete polymerization of the monomer, while subjecting successive portions of the material in said polymerization vessels to gentle non-turbulent stirring transversely to the overall direction of flow of the fluid mass to prevent channeling.

The following examples illustrate ways in which the principle of the invention has been applied, but are not to be construed as limiting the invention.

EXAMPLE 1

A polymerization tower five feet high consisting of an arrangement of apparatus similar to that illustrated in Figs. 1 and 2 of the drawings, was comprised of an assembly of three similar flanged and jacketed sections 1.25 feet high having internal dimensions of 2 feet by 2 feet square cross section, a bottom funnel-shaped section 1.25 feet high having a stuffing box and valved outlet, and a cover plate having a valved inlet and a stuffing box. Each of the three jacketed sections of the tower was provided with an inlet and an outlet to the chamber between the jacket and the shell and contained six banks of internal one inch diameter horizontal tubes at a distance of 2.25 inches between centers. The ends of the tubes were connected to the chamber between the jacket and the shell of each section for passage of heating or cooling fluid therethrough. Alternate banks of the tubes were disposed in horizontal planes with the longitudinal axes of the tubes at right angles to the axes of the adjacent banks of tubes. The lower funnel-shaped section was jacketed and provided with an inlet and outlet for passage of heating or cooling fluid through the chamber between the jacket and the shell of the section. The polymerizing vessel was provided with an agitator comprised of a 1.25 inch diameter shaft having blades of 0.5 inch diameter rods positioned on the shaft so as to rotate between the banks of internal tubes. The agitator shaft was journaled in the stuffing boxes on the top and bottom of the vessel and was driven by a motor-gear assembly connected to the shaft in the conventional manner.

The apparatus described above, having a capacity of approximately 450 pounds of monomeric styrene, was used to polymerize styrene by feeding a solution consisting of 85 per cent by weight of monomeric styrene and 15 per cent of ethylbenzene into the top of the vessel and into admixture with a polymerizing mass of the solution containing about 30 per cent by weight of polymer, at a rate corresponding to 26 pounds of the solution per hour, heating the upper portion of the polymerizing mass (suitably one-third of the total mass in the vessel) to temperatures between 118° and 129° C., the mid-portion to temperatures between 133° and 135° C., the lower portion to a temperature of 130 C. and removing the polymerizing mass from the vessel at a rate corresponding to the rate of feed thereto, as a solution containing 74 per cent by weight of polymer while at the same time rotating the agitator in the polymerizing mass at a rate of 20 revolutions per minute. The polymer is recovered in any usual way, e. g. by heating in vacuum to distill off and remove volatile ingredients. A portion of the polymer thus obtained was injection molded to form test bars of ⅛ by ⅛ inch square cross section. These test bars were used to determine the tensile strength in pounds per square inch of initial cross section and the impact strength of each product in inch-pounds of energy applied as a sharp blow to cause breakage of a test bar. Except for the shape and the dimensions of the test bars and the weight of the hammer used in measuring impact strength, the procedure in determining the tensile strength was similar to that described in A. S. T. M. D638–44T and the procedure followed in measuring impact strength was similar to that described in A. S. T. M. D256–43T. Other molded test pieces were used to determine the heat distortion temperature by a procedure of Heirholzer and Boyer, A. S. T. M. Bulletin No. 134 of May 1945. The rate of flow at 135° C. in terms of seconds required for a sample of the polymer to flow one inch through a ⅛ inch diameter orifice under an applied extrusion pressure of 1000 pounds per square inch was determined in accordance with procedure described in A. S. T. M. D569–44T. Portions of the polymer were tested to determine the proportion of volatile material therein, the per cent methanol soluble and also to determine a viscosity characteristic. The procedure in determining the proportion of volatile material was to weigh a portion of the polymer, then heat it under vacuum at 213° C. for 20 minutes at an absolute pressure of one millimeter and cool and re-weigh. The loss in weight represents volatile ingredients. The procedure in determining the per cent methanol soluble was to weigh a portion of the polymer and dissolve it in toluene. The polymer is then precipitated by mixing the solution with methyl alcohol and is separated by filtering, dried and weighed. The loss in weight represents methanol soluble ingredients. The viscosity characteristic was determined by dissolving a portion of the polymer in toluene to form a solution containing 10 per cent by weight of said polymer and determining the absolute viscosity in centipoises at 25° C. of the solution. The following Table I makes a comparison of the properties of the polystyrene made by the method of the invention with a good grade of commercial polystyrene designated as "Standard."

*Table I*

| Properties | Standard | New |
|---|---|---|
| Tensile strength, lbs./sq. in. | 7,930–8,360 | 7,230 |
| Impact strength, in.-lbs. | 1.0 | 1.0 |
| Flow-time, sec. | 82–94 | 282 |
| Volatile, percent | 0.8–1.2 | 0.25 |
| Heat Distortion, temp. | 80 | 88 |
| Viscosity at 25° C., cps | 23–35 | 28.8 |
| Methanol soluble, percent | 4.5–4.7 | 1.76 |

EXAMPLE 2

The process was carried out under similar conditions to test the method for reproducible results. In each experiment, a solution consisting of 90 per cent by weight of monomeric styrene and 10 per cent of ethylbenzene was fed at temperatures between 134° and 135° C. into the top of the polymerization vessel described in Example 1, and into admixture with a polymerizing mass of the solution containing approximately 25 per cent by weight of polymer at rates corresponding to from 58.5 to 59.5 pounds of the solution per hour. The upper portion (about one-third) of the polymerizing mass was maintained at temperatures between 122° and 133° C., the mid-portion at temperatures between 128° and 140° C. and the lower portion at temperatures between 126° and 127° C. while rotating the agitator at a speed of 20 revolutions per minute. The polymerizing mass was removed from the vessel at a rate corresponding to the rate of feed thereto, as a solution containing approximately 72 per cent by weight of polymer. The polymer was recovered by heating the solution in vacuum to separate volatile ingredients. The properties of the polymer from each of the experiments were determined as previously mentioned and were found to be:

| Experiment | A | B |
|---|---|---|
| Tensile strength lbs./sq. in. | 9,010 | 9,280 |
| Impact strength in.-lbs. | 0.8 | 1.0 |
| Flow-time sec. | 273 | 277 |
| Volatile percent | 0.28 | 0.34 |
| Heat distortion ° C. | 88 | 86 |
| Viscosity at 25° C. cps | 27.4 | 30.9 |
| Methanol soluble percent | 1.0 | 1.06 |

EXAMPLE 3

Styrene was polymerized by feeding the same at a rate corresponding to 20 pounds of the monomeric styrene per hour, into the top of the tower previously described, wherein it was heated to temperatures between 100° and 110° C. during flow through the tower while rotating the agitator in the mass at a rate of about 15 revolutions per minute and withdrawing a solution containing about 45 per cent by weight of polymer from the bottom of the tower in amount corresponding to the rate of feed thereto. The temperature of the polymerizing mass was observed by means of six thermometers spaced along the tower at distances of about eight inches from each other, the uppermost thermometer being eight inches below the top of the tower and the lower thermometer forty-five inches from the top. The unit was operated in continuous manner over a period of 33 hours, at which time the temperatures throughout the polymerizing mass were recorded. Thereafter, the agitator was stopped, but the operation was otherwise continued while observing the temperatures throughout the polymerizing mass in the tower, without agitation. The temperatures of the mass throughout the column were recorded after operating over a period of 8 hours without agitation. The agitator was again rotated at a rate of 15 revolutions per minute while continuing the polymerization and observing the temperatures throughout the mass in the tower. The temperatures were recorded one hour after resuming agitation. Table II gives the temperatures throughout the polymerizing mass in the tower and identifies the position in the tower by the numerals 1, 2, 3, etc., beginning with the topmost thermometer as number 1 and reading downward. The temperatures stated in the respective columns of the table are the temperatures observed after 33 hours of continuous operation with agitation, followed by 8 hours of operation without agitation, then after one hour of operation with agitation.

*Table II*

| Number of Thermometer from Top of Tower | Temperature Throughout Mass, ° C. | | |
|---|---|---|---|
| | After 33 Hrs. with Agitation | After 8 Hrs. No Agitation | After 1 Hr. with Resumed Agitation |
| 1 | 102 | 94 | 98 |
| 2 | 102 | 94 | 99 |
| 3 | 104 | 120 | 103 |
| 4 | 110 | 117 | 103 |
| 5 | 103 | 103 | 104 |
| 6 | 105 | 98 | 98 |

As shown in the table, the temperatures throughout the polymerizing mass in the column were much more uniform when the gentle transverse stirring was provided, than without stirring.

EXAMPLE 4

A mixture of 75 per cent by weight of styrene and 25 per cent of alpha-methyl styrene was partially polymerized by feeding the same at a rate of 38 pounds of the monomers per hour to the top of a reacting body of the monomers and the polymer being formed in a first elongated polymerization vessel similar to that described in Example 1 and continuously withdrawing a portion of the partially polymerized mass from the bottom of said vessel. The stirrer was rotated at a rate of 20 revolutions per minute. The mass was subjected to polymerization temperatures of from 122° to 127° C. in the polymerization vessel and was withdrawn from the bottom as a solution containing 45 per cent by weight of polymer. The solution containing 45 per cent by weight of polymer was withdrawn from the bottom of the first elongated polymerization vessel and was fed by means of a plastics pump into the bottom of a second elongated polymerization vessel filled with a reacting body of the monomer and the polymer being formed, where the mass was slowly moved upward through the second elongated polymerization vessel and was subjected to polymerization temperatures of from 128° to 132° C., and to gentle non-turbulent stirring of successive portions of the mass transversely to the longitudinal axis of the second polymerization vessel by rotating the stirrer at a rate of 1.5 revolutions per minute. A portion of the mass was continuously withdrawn from the top of the vessel. The solution withdrawn from the top of the second elongated polymerization vessel contained 19 per cent by weight of monomer and 81 per cent of polymer.

This application is a continuation-in-part application of our copending application Serial No. 192,504, filed October 27, 1950.

We claim:

1. A method for continuously polymerizing vinylidene compounds which method comprises feeding a liquid comprising at least one polymerizable organic vinylidene compound into a vertical elongated polymerization zone substantially filled with a fluid mass comprising the reactive monomeric material and the polymer being formed, which fluid mass becomes more viscous as the monomeric material is progressively polymerized, wherein the mass is continuously moved forward through said elongated polymerization zone and is subjected to a polymerization temperature and to gentle non-turbulent stirring of successive portions of the mass transversely to the longitudinal axis of the elongated polymerization zone, whereby the fluid mass stratifies into layers each containing a progressively increasing amount of polymer as portions of the layers move forward through the elongated polymerization zone and the monomer is progressively polymerized, the said stirring being sufficient to substantially overcome the tendency toward channeling in the mass and non-turbulent so as not to mix the layers of the fluid, and continuously withdrawing a portion of the mass containing polymer in amount of at least 25 per cent of that which is theoretically possible from the elongated polymerization zone and continuing the process as described above.

2. A method which comprises feeding a liquid comprising at least one polymerizable organic vinylidene compound, wherein the polymerizable portion of the liquid consists of at least 75 per cent by weight of a monovinyl aromatic compound, into a vertical elongated polymerization zone substantially filled with a fluid mass comprising the reactive monomeric material and the polymer being formed, which fluid mass becomes more viscous as the monomeric material is progressively polymerized, wherein the mass is continuously moved through said elongated polymerization zone and is subjected to a polymerization temperature within the range of from 85° to 130° C. and to gentle non-turbulent stirring of successive portions of the mass transversely to the longitudinal axis of the elongated polymerization zone, whereby the mass stratifies into layers each containing a progressively increasing amount of polymer as portions of the layers of the fluid mass move forward through the elongated polymerization zone and the monomer is progressively polymerized, the said stirring being sufficient to substantially overcome the tendency toward channeling in the mass and non-turbulent so as not to mix the layers of the fluid, withdrawing a portion of the fluid mass containing polymer in amount of at least 25 per cent by weight of that which is theoretically possible from the elongated polymerization zone and continuing the process as described above.

3. A method which comprises feeding a monomeric polymerizable monovinyl aromatic compound into an upper portion of a vertical elongated polymerization zone substantially filled with a reacting mass of the monomeric material and the polymer being formed, wherein the reacting mass is continuously moved downward through said polymerization zone and is subjected to a polymerization temperature between 85° and 130° C., and to gentle non-turbulent stirring of successive portions of the mass transversely to the longitudinal axis of the elongated polymerization zone, whereby the mass stratifies into layers each containing a progressively increasing amount of polymer as portions of the upper strata of the layers move slowly downward through the elongated polymerization zone and the monomer is progressively polymerized, the said stirring being sufficient to substantially overcome the tendency toward channeling in the mass and non-turbulent so as not to mix the layers of the fluid, withdrawing a portion of the mass containing from 25 to 80 per cent by weight of polymer from a lower portion of the elongated polymerization zone and replenishing said zone with the monovinyl aromatic compound in amount corresponding to the mass being withdrawn.

4. A process as claimed in claim 3, wherein the monovinyl aromatic compound is polymerized in admixture with from 5 to 20 per cent by weight of a liquid aromatic hydrocarbon having a boiling point between 130° and 200° C.

5. A process as claimed in claim 3, wherein the portion of the reacting mass withdrawn from the elongated polymerization zone is fed into a second vertical elongated polymerization zone substantially filled with a reacting mass comprising monomeric material and the polymer being formed and containing polymer in amount greater than said feed portion, wherein the reacting mass is continuously moved through said second elongated polymerization zone and is subjected to a higher polymerization temperature of up to 240° C. and to gentle non-turbulent stirring of successive portions of the mass transversely to the longitudinal axis of the elongated polymerization zone, whereby the fluid mass stratifies into layers each containing a progressively increasing amount of polymer as portions of the layers move forward through the second elongated polymerization zone and the monomer is progressively polymerized, and continuously withdrawing a portion of the reacting mass from said second elongated polymerization zone containing polymer in amount corresponding to at least 90 per cent by weight of that which is theoretically possible while replenishing said polymerization zone with a solution of monomer containing polymer of said monovinyl aromatic compound in amount of at least 25 per cent by weight.

6. A method which comprises continuously feeding a solution of partially polymerized monomeric styrene containing approximately 25 per cent by weight of polymer into a vertical elongated polymerization zone substantially filled with a reacting fluid mass comprising the monomeric styrene and the polymer being formed, wherein the reacting mass is continuously moved through said elongated polymerization zone and is subjected to a polymerization temperature of from 135° C. up to 240° C. and to gentle non-turbulent stirring of successive portions of the reacting mass transversely to the longitudinal axis of said elongated polymerization zone, whereby the reacting mass stratifies into layers each containing a progressively increasing amount of polymer as portions of the layers of the fluid mass move forward through the elongated polymerization zone and the monomer is progressively polymerized, the said temperature being controlled so that the mass remains flowable and said stirring being sufficient to substantially overcome the tendency toward channeling in the mass and non-turbulent so as not to mix the layers of the fluid, and withdrawing a portion of the fluid mass containing polymer in amount of at least 90 per cent by weight of that which is theoretically possible and replenishing said polymerization zone with a solution of partially polymerized styrene containing about 25 per cent by weight of polymer.

7. A process which comprises feeding monomeric styrene into an upper portion of a vertical elongated polymerization zone substantially filled with a reacting mass of the monomeric styrene and the polymer being formed, wherein the reacting mass is continuously moved downward through said polymerization zone and is subjected to a polymerization temperature between 85° and 130° C. and to gentle non-turbulent stirring of successive portions of the mass transversely to the longitudinal axis of the elongated polymerization zone, whereby the mass stratifies into layers each containing a progressively increasing amount of polymer as portions of the upper strata of the layers move slowly downward through the elongated polymerization zone and the monomer is progressively polymerized, the said stirring being sufficient to substantially overcome the tendency toward channeling in the mass and non-turbulent so as not to mix the layers of the mass of the fluid, withdrawing a portion of the mass containing from 25 to 80 per cent by weight of polymer from a lower portion of the elongated polymerization zone and replenishing said zone with monomeric styrene in amount corresponding to the mass being withdrawn.

References Cited in the file of this patent

UNITED STATES PATENTS

| | | |
|---|---|---|
| 2,451,935 | Foster | Oct. 19, 1948 |
| 2,496,653 | Allen et al. | Feb. 7, 1950 |